United States Patent
Hashimura et al.

(10) Patent No.: US 9,063,353 B2
(45) Date of Patent: Jun. 23, 2015

(54) AIR STABLE, COLOR TUNABLE PLASMONIC STRUCTURES FOR ULTRAVIOLET (UV) AND VISIBLE WAVELENGTH APPLICATIONS

(71) Applicants: Akinori Hashimura, Vancouver, WA (US); Douglas Tweet, Camas, WA (US); Apostolos Voutsas, Portland, OR (US)

(72) Inventors: Akinori Hashimura, Vancouver, WA (US); Douglas Tweet, Camas, WA (US); Apostolos Voutsas, Portland, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 164 days.

(21) Appl. No.: 13/714,073

(22) Filed: Dec. 13, 2012

(65) Prior Publication Data

US 2014/0168742 A1     Jun. 19, 2014

(51) Int. Cl.
| | |
|---|---|
| *G02F 1/03* | (2006.01) |
| *G02F 1/00* | (2006.01) |
| *G02B 5/00* | (2006.01) |
| *B82Y 20/00* | (2011.01) |

(52) U.S. Cl.
CPC .............. *G02F 1/0018* (2013.01); *B82Y 20/00* (2013.01); *G02B 5/008* (2013.01); *Y10S 977/773* (2013.01); *Y10S 977/834* (2013.01)

(58) Field of Classification Search
USPC ........................................................ 359/245
See application file for complete search history.

(56) References Cited

U.S. PATENT DOCUMENTS

| 6,025,202 A | 2/2000 | Natan | |
|---|---|---|---|
| 2009/0080297 A1* | 3/2009 | Engheta et al. | 369/44.14 |
| 2011/0109956 A1* | 5/2011 | Hashimura et al. | 359/290 |

FOREIGN PATENT DOCUMENTS

| JP | 2000-098323 | 4/2000 |
|---|---|---|
| JP | 2010-185970 | 8/2010 |
| WO | WO2010019843 | 2/2010 |

OTHER PUBLICATIONS

L. Tang et al, "Plasmonic Device in Silicon CMOS", Electronic Letters, Jun. 18, 2009, vol. 45, No. 13.
Chowdhury et al, "Aluminum Nanoparticles as Substrate for Metal-Enhanced Fluorescence in the Ultraviolet for Label-Free . . . ", Anal. Chem., 2009, 81, 1397-1403.
P. West et al., Searching for better plasmonic materials, Laser & Photon, Reviews, 2010, pp. 1-13, DOI 10.1002/100900055.

* cited by examiner

*Primary Examiner* — James Jones
(74) *Attorney, Agent, or Firm* — Law Office of Gerald Maliszewski; Gerald Maliszewski

(57) ABSTRACT

A plasmonic optical device is provided operating in near ultra violet (UV) and visible wavelengths of light. The optical device is made from a substrate and nanoparticles. The nanoparticles have a core with a negative real value relative permittivity of absolute value greater than 10 in a first range of wavelengths including near UV and visible wavelengths of light, and a shell with an imaginary relative permittivity of less than 5 in the first range of wavelengths. A dielectric overlies the substrate, and is embedded with the nanoparticles. If the substrate is reflective, a reflective optical filter is formed. If the substrate is transparent, the filter is transmissive. In one aspect, the dielectric is a tunable medium (e.g., liquid crystal) having an index of refraction responsive to an electric field. The tunable medium is interposed between a first electrode and a second electrode.

19 Claims, 6 Drawing Sheets

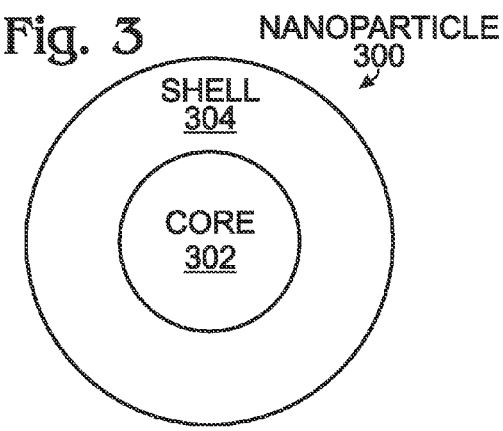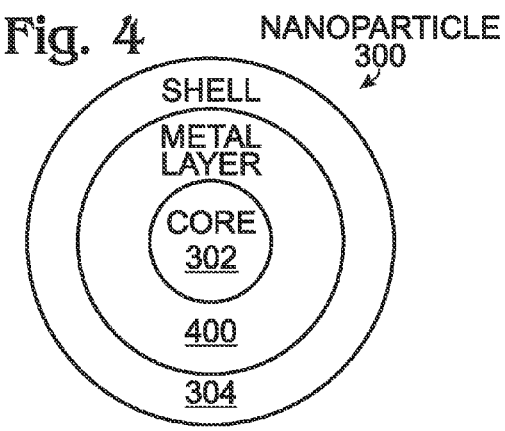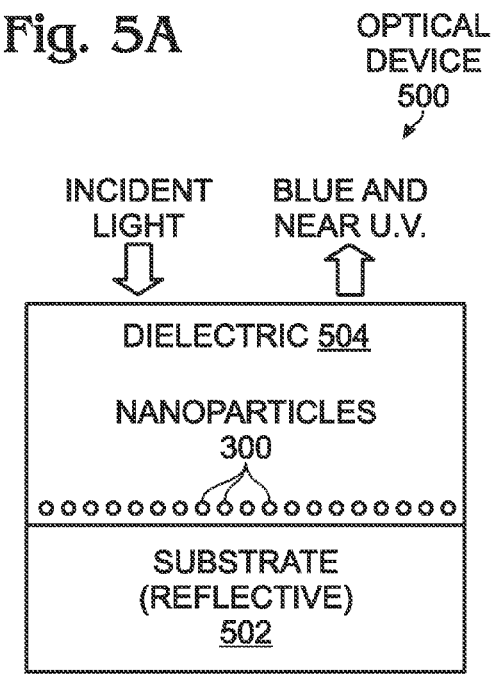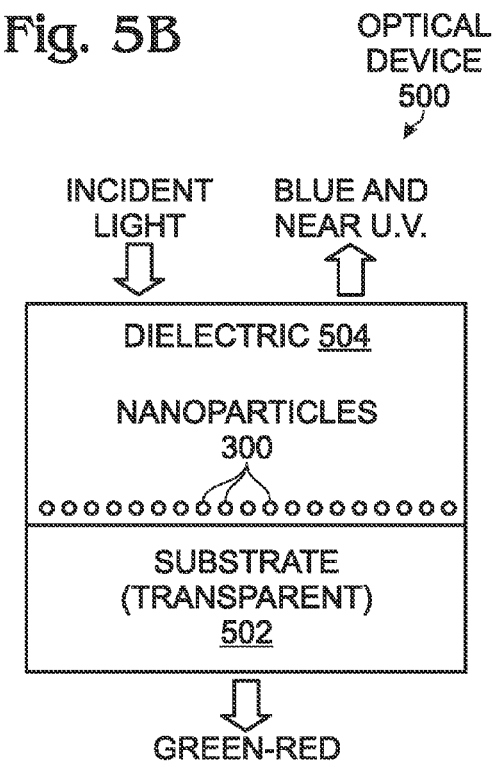

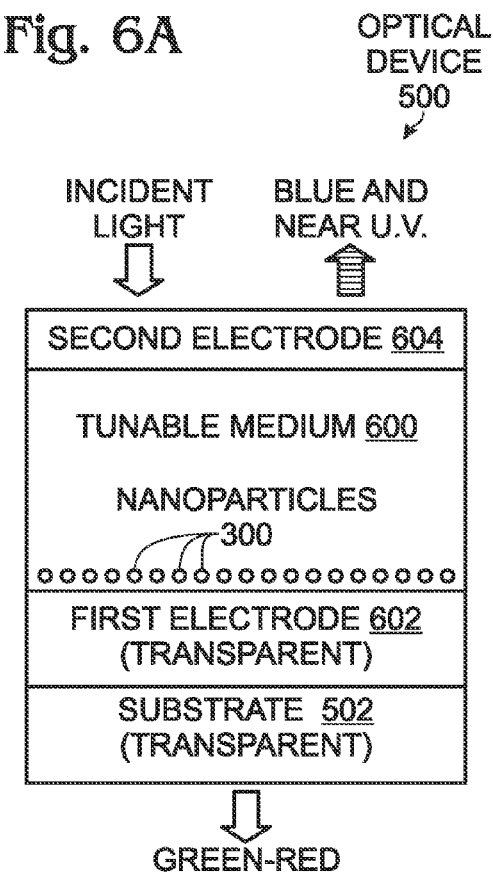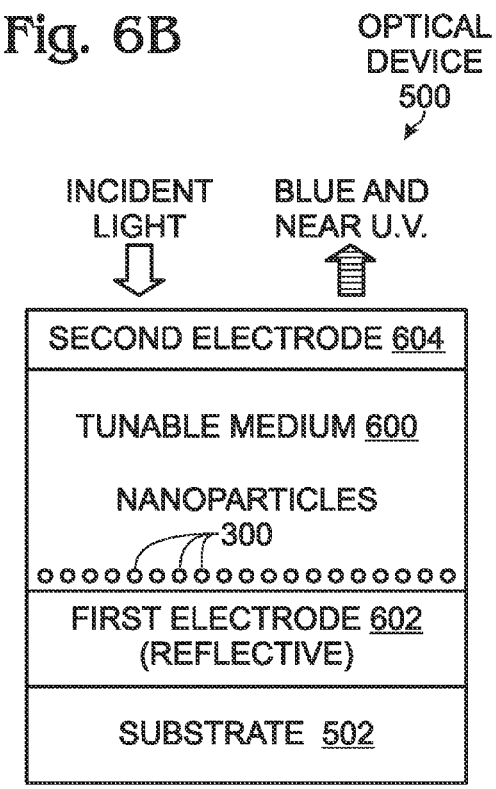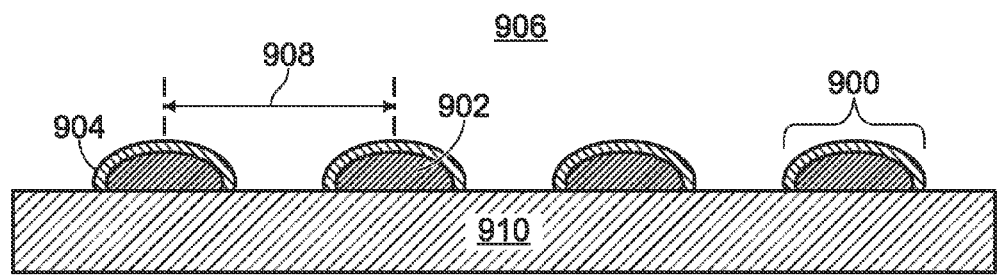

Fig. 11

```
                    START ─1100
                      │
                      ▼                    ─1102
         ┌─────────────────────────────┐
         │    PROVIDING SUBSTRATE      │
         └─────────────────────────────┘
                      │                    ─1104
                      ▼
         ┌─────────────────────────────┐
         │    FORMING NANOPARTICLES    │
         └─────────────────────────────┘
              │           │                ─1104a
              │           ▼
              │  ┌──────────────────────────────────────┐
              │  │ FORMING NANOPARTICLES WITH FIRST DIAMETER │
              │  └──────────────────────────────────────┘
              │                │            ─1104b
              │                ▼
              │  ┌──────────────────────────────────────┐
              │  │ MAINTAINING FIRST DIAMETER IN AIR ENVIRONMENT │
              │  └──────────────────────────────────────┘
              │                │            ─1106
              ▼                ▼
         ┌─────────────────────────────────────────┐
         │   EMBEDDING NANOPARTICLES IN TUNABLE MEDUIM   │
         └─────────────────────────────────────────┘
                      │                    ─1108
                      ▼
         ┌─────────────────────────────────────────┐
         │  INTERPOSING TUNABLE MEDIUM BETWEEN ELECTRODES │
         └─────────────────────────────────────────┘
```

AIR STABLE, COLOR TUNABLE PLASMONIC STRUCTURES FOR ULTRAVIOLET (UV) AND VISIBLE WAVELENGTH APPLICATIONS

RELATED APPLICATION

The application is a Continuation-in-Part of an application entitled, PLASMONIC IN-CELL POLARIZER, invented by Aki Hashimura et al., Ser. No. 13/558,396, filed on Jul. 26, 2012;

which is a Continuation-in-Part of an application entitled, PLASMONIC REFLECTIVE DISPLAY FABRICATED USING ANODIZED ALUMINUM OXIDE, invented by Aki Hashimura et al., Ser. No. 13/449,370, filed on Apr. 19, 2012;

which is a Continuation-in-Part of an application entitled, METHOD FOR IMPROVING METALLIC NANOSTRUCTURE STABILITY, invented by Aki Hashimura et al., Ser. No. 13/434,548, filed on Mar. 29, 2012;

which is a Continuation-in-Part of an application entitled, PLASMONIC ELECTRONIC SKIN, invented by Tang et al., Ser. No. 12/836,121, filed on Jul. 14, 2010;

which is a Continuation-in-Part of an application entitled, PLASMONIC DEVICE TUNED USING PHYSICAL MODULATION, invented by Tang et al., Ser. No. 12/646,585, filed on Dec. 23, 2009, issued as U.S. Pat. No. 8,223,425;

which is a Continuation-in-Part of an application entitled, PLASMONIC DEVICE TUNED USING LIQUID CRYSTAL MOLECULE DIPOLE CONTROL, invented by Tang et al., Ser. No. 12/635,349, filed on Dec. 10, 2009;

which is a Continuation-in-Part of an application entitled, PLASMONIC DEVICE TUNED USING ELASTIC AND REFRACTIVE MODULATION MECHANISMS, invented by Tang et al., Ser. No. 12/621,567, filed on Nov. 19, 2009;

which is a Continuation-in-Part of an application entitled, COLOR-TUNABLE PLASMONIC DEVICE WITH A PARTIALLY MODULATED REFRACTIVE INDEX, invented by Tang et al., Ser. No. 12/614,368, filed on Nov. 6, 2009. All the above-referenced applications are incorporated herein by reference.

BACKGROUND OF THE INVENTION

1. Field of the Invention

This invention generally relates to plasmonic displays and, more particularly, to a method for improving the stability of metallic nanostructures used in the fabrication of plasmonic displays having an improved short wavelength response.

2. Description of the Related Art

Reflective display or color-tunable device technology is attractive primarily because it consumes substantially less power than liquid crystal displays (LCDs) and organic light emitting diode (OLED) displays. A typical LCD used in a laptop or cellular phone requires internal (backlight) illumination to render a color image. In most operating conditions the internal illumination that is required by these displays is in constant competition with the ambient light of the surrounding environment (e.g., sunlight or indoor overhead lighting). Thus, the available light energy provided by these surroundings is wasted, and in fact, the operation of these displays requires additional power to overcome this ambient light. In contrast, reflective display technology makes good use of the ambient light and consumes substantially less power.

One challenge for reflective displays is the achievement of high quality color. In particular, most reflective display technologies can only produce binary color (color/black) from one material set. Because of this, at least three sub-pixels using different material sets must be used when employing a side-by-side sub-pixel architecture with fixed colors. This limits the maximum reflected light for some colors to about ⅓, so that the pixels of this type cannot produce saturated colors with a good contrast.

In polymer-networked liquid crystal (PNLC) or polymer dispersed liquid crystal (PDLC) devices, liquid crystals are dissolved or dispersed into a liquid polymer followed by solidification or curing of the polymer. During the change of the polymer from a liquid to solid, the liquid crystals become incompatible with the solid polymer and form droplets throughout the solid polymer. The curing conditions affect the size of the droplets that in turn affect the final operating properties of the "smart window". Typically, the liquid mix of polymer and liquid crystals is placed between two layers of glass or plastic that includes a thin layer of a transparent, conductive material followed by curing of the polymer, thereby forming the basic sandwich structure of the smart window. This structure is in effect a capacitor.

Electrodes from a power supply are attached to the transparent electrodes. With no applied voltage, the liquid crystals are randomly arranged in the droplets, resulting in scattering of light as it passes through the smart window assembly. This scattering results in a translucent "milky white" appearance. When a voltage is applied to the electrodes, the electric field formed between the two transparent electrodes on the glass causes the liquid crystals to align, allowing light to pass through the droplets with very little scattering and resulting in a transparent state. The degree of transparency can be controlled by the applied voltage. This is possible because at lower voltages, only a few of the liquid crystals align completely in the electric field, so only a small portion of the light passes through while most of the light is scattered. As the voltage is increased, fewer liquid crystals remain out of alignment, resulting in less light being scattered. It is also possible to control the amount of light and heat passing through, when tints and special inner layers are used. It is also possible to create fire-rated and anti X-Ray versions for use in special applications. Most of the devices offered today operate in on or off states only, even though the technology to provide for variable levels of transparency is available. This technology has been used in interior and exterior settings for privacy control (for example conference rooms, intensive-care areas, bathroom/shower doors) and as a temporary projection screen.

The full range of colors produced by plasmon resonances resulting from metal nanostructures has been known since ancient times as a means of producing stained colored glass. For instance, the addition of gold nanoparticles to otherwise transparent glass produces a deep red color. The creation of a particular color is possible because the plasmon resonant frequency is generally dependent upon the size, shape, material composition of the metal nanostructure, as well as the dielectric properties of the surrounding environment. Thus, the optical absorption and scattering spectra (and therefore the color) of a metal nanostructure can be varied by altering any one or more of these characteristics. The parent applications listed above describe means of electronically controlling these color-producing characteristics.

The properties of metallic nanoparticles have drawn significant attention due to their application in photonics and electro-optics, as well as their potential application in biological/chemical sensors and renewable energy. Moreover, the fabrication of periodic metal nanoparticle arrays for applications in photonics utilizing their localized surface plasmon resonance (LSPR) properties has been extensively studied in recent years. Among various processing techniques, depositing a film of metal on a nano-size patterned mask and using a lift-off process to remove the sacrificial layer is becoming a widely used technique, because it allows for fabricating nanoparticles with precisely controlled shape, size, and particle spacing.

Ag metallic nanoparticles are generally used as the material of choice for plasmonics due to its strong plasmonic response across the visible and near infrared (IR) wavelength range, while other materials support a strong resonance only in a narrow wavelength range. Specifically, many of the characteristics depend on the permittivity value at specific wavelengths. The real part of the permittivity indicates how the electrons are driven by the electromagnetic field, and a large negative real part of permittivity is desirable for plasmonic devices due to the strong polarization induced by the external electric field of incident light. As the wavelength decreases, the real permittivity decreases in magnitude for all the metals except Al in which the value stays large, even in the blue wavelength range. The imaginary part of the permittivity represents the losses encountered in polarizing the material. Although Al is lossy at the red part of the spectrum, it has lower loss than materials such as Au at short wavelengths. This combination of a large negative real part and a small imaginary part of permittivity indicates that Al is a viable metal for plasmonics, especially at short visible wavelengths.

However, a problem arises when plasmonic nanoparticles are made of Al because the material undergoes oxidation in ambient atmosphere, to form aluminum oxide layer shell. The oxide formed at the surface of Al nanoparticles generates plasmon resonance shifts due to refractive index change at the metal-dielectric interface. Moreover, the approach to tuning the plasmon resonances by changing the dielectric constant of the surrounding environment of the nanoparticles is significantly affected by the dielectric oxide shell formed at the surface of Al nanoparticles.

FIGS. 1A and 1B show an example of a metal nanoparticle configured to reflect incident light at visible wavelengths due to localized surface plasmon. (LSPR) enhancement (prior art). With an initial surrounding medium having a refractive index of 1.5, reflected light is in the green range of the visible spectrum (FIG. 1A). When the refractive index of the medium is switched from 1.5 to 2.0, the reflected light is red-shifted to a longer wavelength of the visible spectrum (FIG. 1B).

FIGS. 2A and 2B, in contrast to FIGS. 1A and 1B, show an example of a metal nanoparticle surrounded by an oxide shell (prior art). If the oxide shell has a similar refractive index compared to its surrounding medium, the resulting light that is reflected in FIG. 2A is similar to FIG. 1A. However, tuning the refractive index of the surrounding medium to 2.0 (FIG. 2B) does not result in a significant change in the plasmon resonance because the near-field enhancement of localized plasmon-polaritons is strongest and most efficient at the immediate interface of metal-dielectric layers.

It would be advantageous if new structures existed to achieve the tuning of plasmonic resonances across a wide range of visible spectrum, especially in the blue regime, as required for display-related and optical filter applications.

SUMMARY OF THE INVENTION

Disclosed herein are nanostructures that can achieve good localized surface plasmon polariton resonances (LSPR) at short visible wavelengths with high environmental stability and robustness. Many research activities in the past have explored the possibility of tuning plasmon resonance modes by varying the physical features, sizes, and spacing of the metallic structures. However, recent studies have shown that tuning of the plasmon resonance modes is possible by changing the effective dielectric constant of the surrounding medium of the metallic structures. For a two-pixel reflective color display configuration for example, the short-wavelength pixel may require the tunability of blue to green color spectra in liquid crystal with an ordinary refractive index of $n_o$~1.5. In a medium such as liquid crystal with a high effective dielectric constant, the plasmon reflection peak intensity of Ag nanoparticles at short wavelengths is significantly smaller than the peak intensity at long wavelength, i.e. above 500 nanometers (nm).

In the past, many researchers have focused on obtaining plasmon resonance modes using silver or gold, but little attention is being given to other types of metals. Specifically, aluminum is known to have low absorption at wavelengths less than 400 nm and plasmon resonances can extend into ultra violet (UV) spectrum. Using aluminum nanoparticles as a color generation pixel for a display, a blue to green color shift is possible with liquid crystal medium, obtaining the highly reflective performance required for color reflective displays used in products such as tablets and mobile phones. Moreover, with proper pixel design, aluminum (Al) nanostructures can be used to extend plasmon resonances into the near UV or infrared (IR) regimes, achieving a black pixel. Al nanoparticles can also be useful in optical bandpass transmissive and reflective filters.

Accordingly, a plasmonic optical device is provided to operate in near UV and visible wavelengths of light. The optical device is made from a substrate and nanoparticles. The nanoparticles have a core with a negative real value relative permittivity of absolute value greater than 10 in a first range of wavelengths including near UV and visible wavelengths of light, and a shell with an imaginary relative permittivity of less than 5 in the first range of wavelengths. A dielectric overlies the substrate, and is embedded with the nanoparticles. If the substrate is reflective, a reflective optical filter is formed. If the substrate is transparent, the filter is transmissive.

In one aspect, the dielectric is a tunable medium (e.g., liquid crystal) having an index of refraction responsive to an electric field. The tunable medium is interposed between a first electrode and a second electrode. If the first and second electrodes are transparent and formed overlying a transparent substrate, a transmissive display can be formed. If the first electrode is optically reflective in the first range of wavelengths and formed overlying the substrate, then a reflective display is formed.

The nanoparticles may have a core of zinc (Zn) or aluminum (Al), and a shell of silver (Ag), titanium nitride (TiN), or a metal-doped semiconductor such as aluminum zinc oxide (AZO), gallium zinc oxide GZO), indium gallium zinc oxide (IGZO), or indium tin oxide (ITO).

Additional details of the above-described optical plasmonic device, a method for forming an optical plasmonic device, and an air stable, color tunable plasmonic nanoparticle are provided below.

BRIEF DESCRIPTION OF THE DRAWINGS

FIG. 3 is a partial cross-sectional view of an air stable, color tunable plasmonic nanoparticle.

FIG. 4 is a partial cross-sectional view depicting a variation of the nanoparticle of FIG. 3.

FIGS. 5A and 5B are partial cross-sectional views of a first plasmonic optical device in near UV and visible wavelengths of light.

FIGS. 6A and 6B are partial cross-sectional views of a second plasmonic optical device with high color tunability in near UV and visible wavelengths of light.

FIG. 9 is a partial cross-sectional view of a hybrid nanoparticle structure.

FIG. 11 is a flowchart illustrating a method for fabricating a plasmonic optical device to operate in near UV and visible wavelengths of light.

DETAILED DESCRIPTION

Figure 1A:
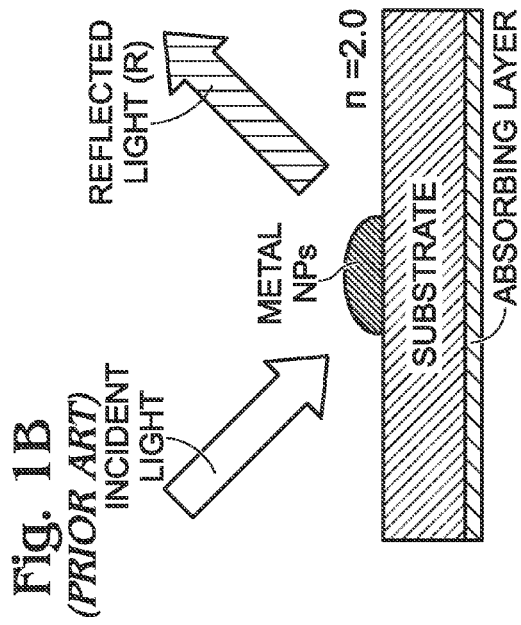
FIGS. 1A and 1B show an example of a metal nanoparticle configured to reflect incident light at visible wavelengths due to localized surface plasmon (LSPR) enhancement (prior art).
Figure 2A:
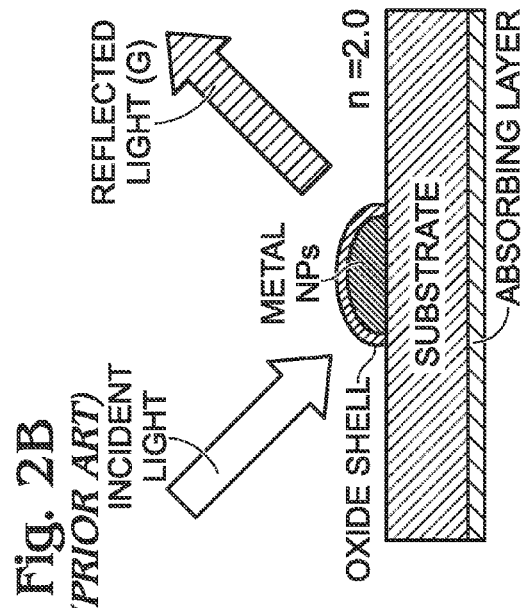
FIGS. 2A and 2B, in contrast to FIGS. 1A and 1B, show an example of a metal nanoparticle surrounded by an oxide shell (prior art).
Figure 1B:
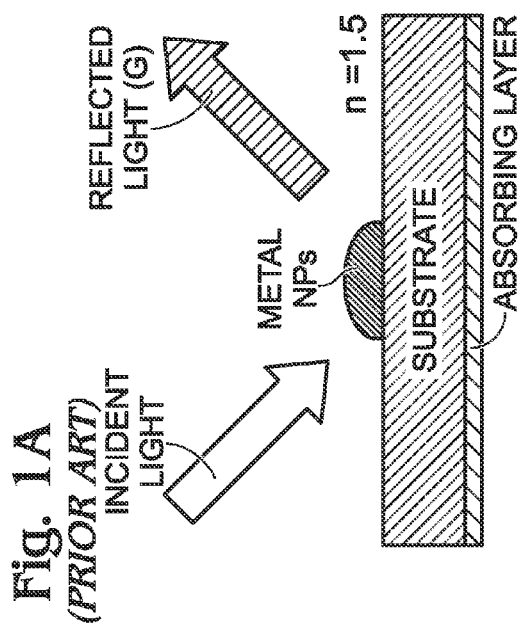
Figure 2B:
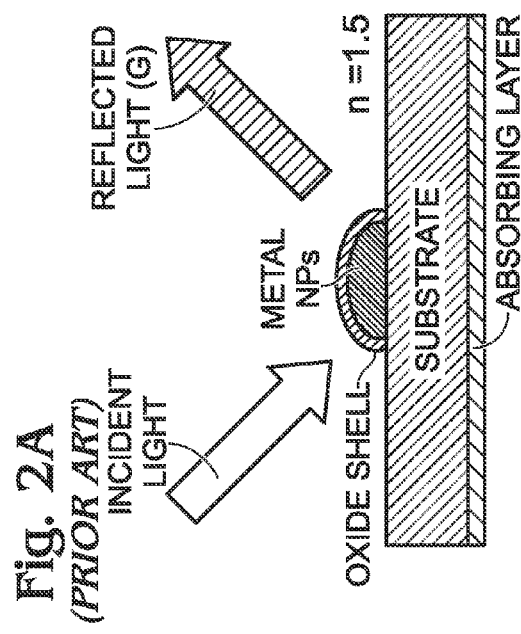

FIG. 3 is a partial cross-sectional view of an air stable, color tunable plasmonic nanoparticle. The nanoparticle 300 comprises a core 302 having a negative real value relative permittivity of absolute value greater than 10 in a first range of wavelengths including near ultraviolet (UV) and visible wavelengths of light. A shell 304 overlies the core having an imaginary value relative permittivity of less than 5 in the first range of wavelengths.

Relative permittivity, also known as the dielectric constant, is a measure of how a material responds to an external electric field. It typically depends on the frequency of the electric field, so it is different for DC fields and the very high frequencies of electric fields in light. The relative permittivity is usually a complex number. The real part describes the strength of the polarization of the material induced by the external field, while the imaginary part describes the losses encountered in polarizing that material.

The core 302 may be made of aluminum (Al) or zinc (Zn). The shell 304 may be made of titanium nitride (TiN), silver (Ag), or metal-doped semiconductors such as aluminum zinc oxide (AZO), gallium zinc oxide (GZO), indium gallium zinc oxide (IGZO), or indium tin oxide (ITO). Other, unmentioned, materials having similar characteristics to the ones mentioned above might also be used. The shell material 304 is more stable in an air environment, as compared to the core 302.

FIG. 4 is a partial cross-sectional view depicting a variation of the nanoparticle of FIG. 3. In this aspect the nanoparticle 300 further comprises a metal layer 400 interposed between the core 302 and the shell 304. Typically, the core 302 has a first anodic index, the shell 304 has a second anodic index, and the metal layer 400 has a third anodic index that is between the first and second anodic indexes. For example, core 302 may be Al, the shell 304 Ag, and the metal layer 400 chromium (Cr).

In some cases, galvanic corrosion may result depending on the fabrication method and use of the nanoparticles. It is well known that different metals have different electrochemical potentials. When different metals touch inside an electrolyte, a galvanic couple is created, where one metal acts as an anode and the other metal acts as a cathode, causing the anode metal to dissolve. An anodic index is used to compare the galvanic compatibility of metals. The anodic index is a measurement of the electrochemical voltage developed between a particular metal and gold. The relative voltage of a pair of metals can be found by subtracting their anodic index values. To avoid galvanic corrosion, there should be no more than a 0.2 to 0.5V difference in anodic index between two metals, depending on how controlled the environment is. Ag and Al have a 0.75V difference (Al 0.90, Ag 0.15V), so the intermediate layer may be chromium (0.60V) or tin (0.65V). However, other materials with similar characteristics might also be used.

FIGS. 5A and 5B are partial cross-sectional views of a first plasmonic optical device in near UV and visible wavelengths of light. In this aspect, the optical device 500 comprises a substrate 502. A dielectric 504 overlies the substrate 502, and is embedded with nanoparticles 300. As described above, the nanoparticles 300 have a core (see FIG. 3) with a negative real value relative permittivity of absolute value greater than 10 in a first range of wavelengths including near UV and visible wavelengths of light, and a shell with an imaginary relative permittivity of less than 5 in the first range of wavelengths. In FIG. 5A, the substrate is optically reflective, forming a reflective optical filter capable of reflecting blue and near UV wavelength light. In FIG. 5B, the substrate is transparent, forming a transmissive filter capable of reflecting blue and near UV wavelength light, while passing light having longer wavelengths than blue light. Although the nanoparticles are shown immediately overlying the substrate in a plane, in other aspects not shown, the nanoparticles may be more evenly distributed throughout the dielectric.

FIGS. 6A and 6B are partial cross-sectional views of a second plasmonic optical device with high color tunability in near UV and visible wavelengths of light. In this aspect, the dielectric is a tunable medium 600 having an index of refraction responsive to an electric field. The optical device 500 further comprises a first electrode 602 and a second electrode 604. Liquid crystal (LC) is one common example of a tunable medium, but other tunable media are known in the art. The tunable medium 600 with embedded nanoparticles 300 is interposed between the first electrode 602 and second electrode 604. Although the nanoparticles are shown immediately overlying the first electrode in a plane, in other aspects not shown, the nanoparticles may be more evenly distributed throughout the tunable medium.

In FIG. 6A the first electrode 602 is transparent and formed overlying transparent substrate 502. The tunable medium 600 with embedded nanoparticles 300 overlies the first electrode 602. The second electrode 604 is transparent and overlies the tunable medium 600. In this aspect, a transmissive display is formed capable of reflecting blue and near UV wavelength light, while passing light having longer wavelengths than blue light.

In FIG. 6B the first electrode 602 is optically reflective in a first range of wavelengths and formed overlying the substrate 502. The tunable medium 600 with embedded nanoparticles 300 overlies the first electrode 602, and the second electrode 604 is transparent and overlies the tunable medium. In this aspect, a reflective display is formed capable of reflecting blue and near UV wavelength light.

As noted above in the description of FIG. 3, the shell material remains stable, maintaining a constant diameter, in an air environment. The core may be Zn or Al, and the shell Ag or TiN, or a metal-doped semiconductor such as AZO, GZO, IGZO, or ITO. As noted above in the description of FIG. 4, a metal layer may be interposed between the core and the shell. In one aspect, the nanoparticle cores have a first anodic index, the shells have a second anodic index, and the metal layers have a third anodic index that is between the first and second anodic indexes. For example, the nanoparticles may have an Al core, Ag shell, and a Cr metal layer.

For a tunable plasmonic band-pass filter (BPF), metal nanoparticle structures are designed so that the output transmission and reflection performances achieve a wide bandwidth and sharp cut-off frequencies similar to the conventional band-pass filter. Due to elimination of multiple stacked layers configuration, plasmonic band-pass filters can potentially have a very good cost-to-performance metric over conventional designs. Moreover, the tuning capability of plasmon resonances is beneficial for realizing a tunable band-pass filter that can potentially be used in different types of applications.

Figure 7A:
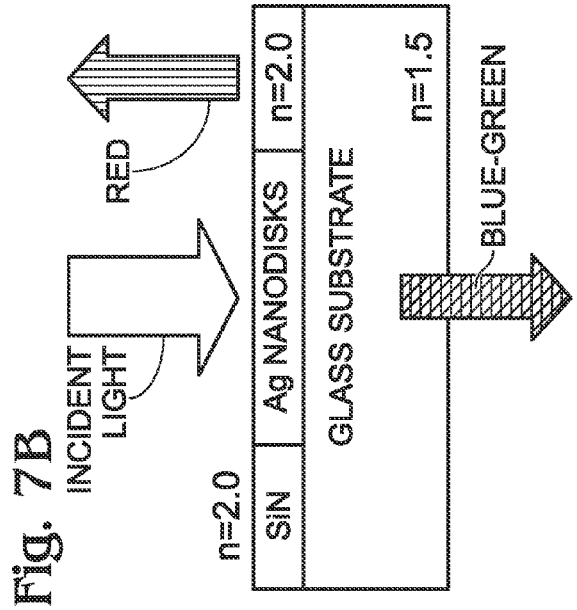
FIGS. 7A and 7B are partial cross-sectional views of exemplary filter structures using Ag nanodiscs with an 80 nanometer (nm) diameter embedded between a tunable medium having a refractive index tunable from n=1.0 to 2.0.
Figure 7B:
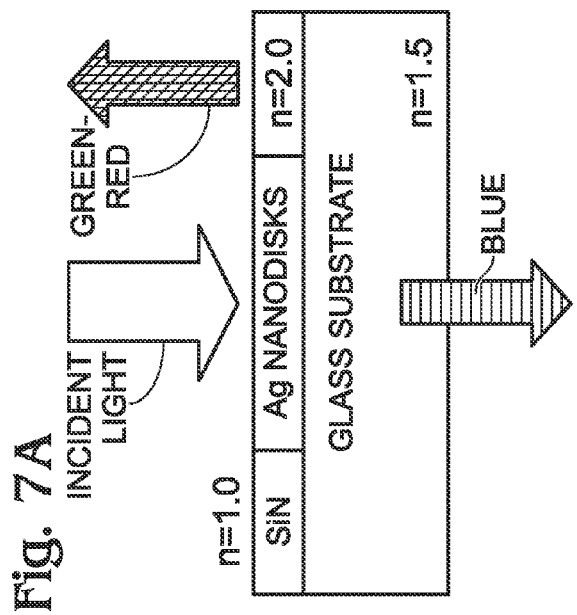

FIGS. 7A and 7B are partial cross-sectional views of exemplary filter structures using Ag nanodiscs with an 80 nanometer (nm) diameter embedded between a tunable medium having a refractive index tunable from n=1.0 to 2.0. At an index of n=1.0 (FIG. 7A), the filter transmits blue and reflects green-to-red wavelengths, but after the refractive index of the medium is changed to n=2.0 (FIG. 7B), the filter transmits blue-to-green wavelengths and reflects red wavelength. As shown in these figures, the nanoparticles are embedded in a film layer, in this case SiN, interposed between the tunable medium and the substrate. Although not explicitly shown, the devices of FIGS. 5A, 5B, 6A, and 6B may incorporate a similar structure, where the nanoparticles are formed in a separate dielectric immediately overlying the substrate (other than the dielectric 504) in FIGS. 5A and 5B, or where the nanoparticles are formed in a fixed index of refraction dielectric immediately overlying the first electrode in FIGS. 6A and 6B.

Figure 8A:
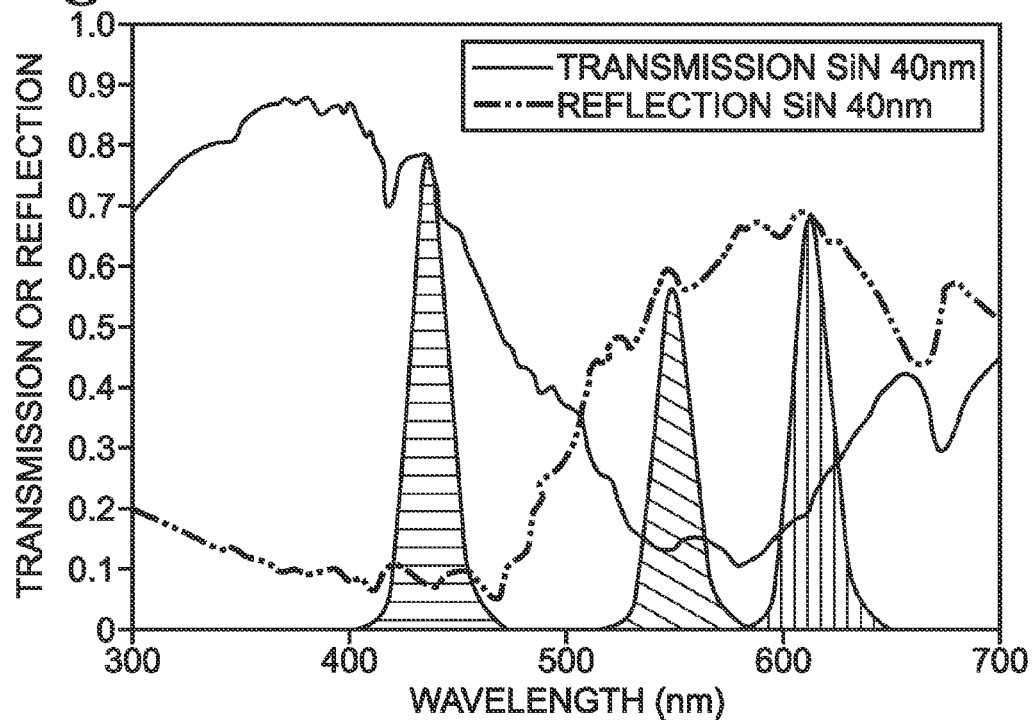
FIGS. 8A and 8B are, respectively, simulation results of the band-pass filters shown in FIGS. 7A and 7B.
Figure 8B:
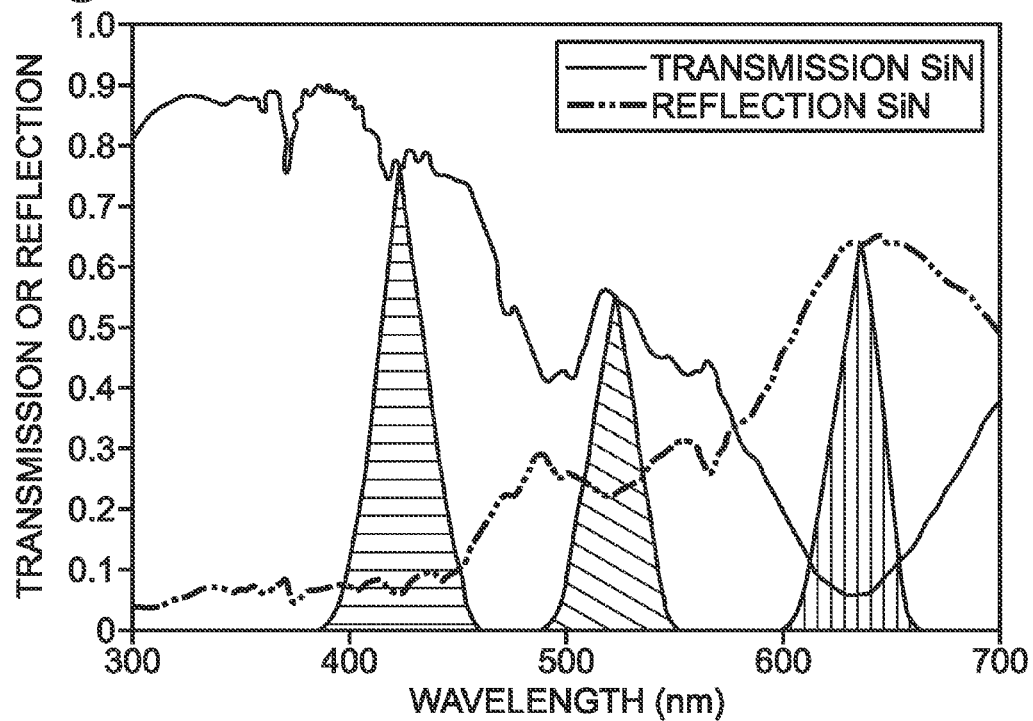

FIGS. 8A and 8B are, respectively, simulation results of the band-pass filters shown in FIGS. 7A and 7B. According to the simulation, a band-pass filter using Ag nanostructures can achieve transmission in all the visible wavelengths and reflection in green-to-red wavelengths. However, for a band-pass filter that needs filtering at lower wavelengths near the UV spectrum in the transmission mode or near UV to blue spectra in the reflection mode, aluminum nanostructures achieve much better performance.

Aluminum is cost effective and one of the most widely used materials in industry today. However the material is well known for its reaction in atmospheric oxygen. After short exposure, a thin aluminum oxide on the order of few nanometers can easily form at the surface of the metal. The layers generated from oxidation, also known as alumina, are typically amorphous and are resistant to corrosion and further oxidation of the material. Even thicker oxide layers up to ~20 nm can form from different aluminum alloy materials. When aluminum is used as the material in metal nanoparticles to generate plasmon resonances, the ambient environment causes nanoparticles to generate thin oxide shells around the aluminum core structures. Due to high surface-to-volume ratio of individual nanoparticles, surface oxidation becomes a significant problem to the polarizability of nanoparticles. In general, the effective dielectric constant of nanostructure can be explained using Maxwell-Garnett effective medium theory:

$$\frac{\varepsilon_{eff} - \varepsilon_m}{\varepsilon_{eff} + 2\varepsilon_m} = f_v \frac{\varepsilon_p - \varepsilon_m}{\varepsilon_p + 2\varepsilon_m}$$

where $f_v$ is the volume fraction of spherical nanoparticles, $\varepsilon_p$ is the dielectric function of the metal nanoparticles, and $\varepsilon_m$ is the dielectric function of the surrounding medium. When a thin oxide shell layer is present at the surface of metal core structures, the effective dielectric constant value of nanoparticles, $\varepsilon_{eff}$, consists of more complex equations in the general effective medium theory. Typically, the near-field plasmon-polaritons enhancement is significant at a distance up to ~20 nm to ~30 nm from the dielectric-metal interfaces. Beyond that point, the plasmon effect becomes less significant and thus changing the refractive index of the surrounding medium is no longer an effective method for tuning the plasmon resonances.

To compensate for lack of wavelength tunability when the oxide shell is present around metal nanoparticles, bimetallic nanostructures with two or more different metal layers are presented herein. The inner core of the nanoparticles consists of a metal structure with permittivity of high negative real value and outer shell with material that has higher stability in ambient environment. For example, nanoparticles consisting of an Al core and Ag outer shell layer achieve strong localized surface plasmon resonance (LSPR) that can interact with light at short visible wavelength below λ=500 nm. For use in applications where these bimetallic layer nanoparticles are in contact and immersed in electrolytes, an ion migration can occur due to Al and Ag metals having different electrical potentials and thus acting as anode and the other as cathode. To avoid galvanic corrosion arising from two different electric potentials of metals, an intermediate layer that is similar to both potentials can be included between Al and Ag layers. For example, Cr, which has anodic index of 0.60, can be an intermediate layer for Al inner core (anodic index of 0.90) and Ag outer shell (anodic index of 0.15).

With the bimetallic nanostructures presented herein, the issue of photo-oxidation is reduced by having a thin metal nano-shell that is more environmentally stable around the core nanoparticles. The color generation from LSPR effect is mainly enhanced by the inner Al core, which is inherently a better material for achieving strong plasmon resonances at shorter wavelengths below 500 nm due to the permittivity values of the metal.

FIG. 9 is a partial cross-sectional view of a hybrid nanoparticle structure. The hybrid nanostructure 900 consists of an inner metal core 902 in the shape of a disk, and an outer metal shell 904, with each nanoparticle in an ordered array in a medium 906 with certain defined pitch 908 on a substrate 910.

Figure 10:
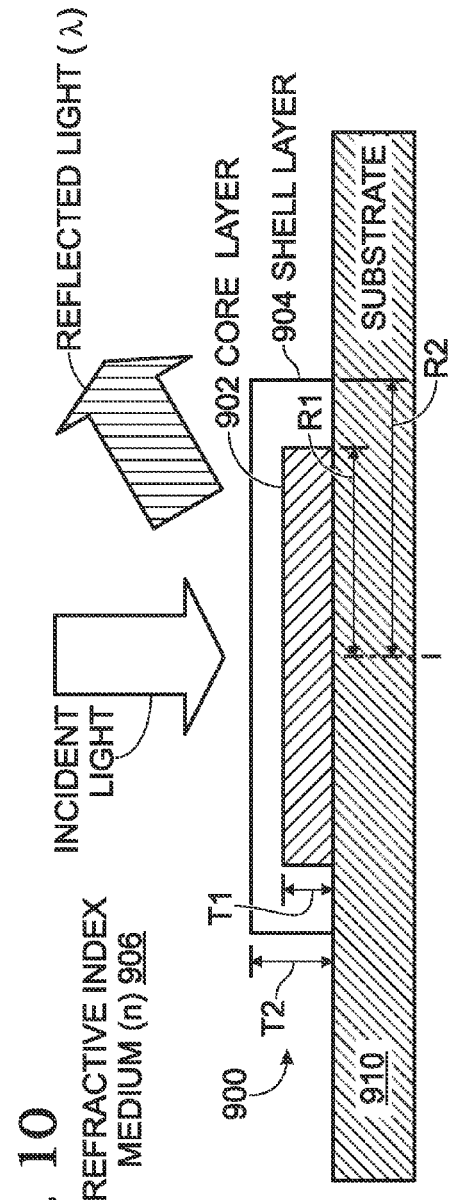
FIG. 10 is a cross-sectional view of a design used in a simulation.

FIG. 10 is a cross-sectional view of a design used in simulation. To verify how the oxidation of plasmonic structures affects color tunability in reflective display or band-pass filter applications, finite difference time domain (FDTD) simulations were used to compare pure Al or Ag nanostructures with Al core and aluminum oxide shell nanostructures, as well as Al/Ag hybrid nanostructures similar to the one shown in FIG. 9. The visible light is incident at direction perpendicular to the plasmonic nanostructures 900 which include the core 902 and shell layers 904. The structure is a disk-shaped nanoparticle that is placed on top of a glass substrate 910 with the refractive index of the surrounding medium 906 tuned from n=1.5 to n=2.0.

The summary of the simulation results are shown in Table 1. For a nanodisk structure design with Al core only (design #1), the total peak reflection wavelength shift was approximately 80 nm for refractive index change of Δn=0.5. However, with an oxide shell layer around the Al core structure of the same dimension (designs #3, #4, #5), the wavelength tunability drops to 50 nm, 30 nm, and 20 nm respectively, depending on the thickness of the oxide layer. As shown, the tunability is affected the most for oxide layer thickness beyond 20 nm (designs #4, #5). For comparison, a bimetallic structure with Al inner core and Ag outer shell nanodisk was simulated (design #6). The design shows the peak wavelength tuning range of Δλ=140 nm, which is comparable to the tuning range of Ag nanodisk (design #2). However, the peak reflectance of Ag shell/Al core structure shifts to longer wavelengths, as compared to Al core only structure counterpart. Therefore, a target peak reflection wavelength can be achieved with further design optimization of Al core size and thickness of Ag shell layer.

The relationship between core diameter, shell thickness, peak reflection, and/or wavelength delta is complex. Also involved is the pitch between the nanoparticles, as well as how much the refractive index of the tunable medium changes. The thinner the metal shell, the more the plasmon resonance resembles the core. Similarly, if the shell is too thick, the core is not "seen" and the plasmon resonance is purely that of the shell. This relationship can be exploited to help tune the resonance.

In conclusion, the advantages of having Al inner core and Ag outer shell bimetallic structure are as follow: (1) higher reflection performance at lower target peak reflection wavelength compared to pure Ag nanoparticles, (2) larger wavelength tunability compared to pure Al nanoparticles of the same dimension, and (3) better environmental stability compared to pure Al nanoparticles.

TABLE 1

Summary of FDTD simulation results for disk nanostructure designs.

| design # | core | shell | R1 (nm) | R2 (nm) | T1 (nm) | T2 (nm) | $\%_R/\lambda_R$(nm) @n = 1.5 | $\%_R/\lambda_R$(nm) @n = 2.0 | Δλ (nm) |
|---|---|---|---|---|---|---|---|---|---|
| 1 | Al | — | 40 | — | 20 | — | 30/450 | 24/530 | 80 |
| 2 | Ag | — | 40 | — | 20 | — | 49/640 | 51/760 | 120 |
| 3 | Al | Al$_2$O$_3$ | 40 | 45 | 20 | 30 | 35/440 | 26/490 | 50 |
| 4 | Al | Al$_2$O$_3$ | 40 | 60 | 20 | 40 | 35/450 | 26/480 | 30 |
| 5 | Al | Al$_2$O$_3$ | 40 | 70 | 20 | 50 | 35/455 | 26/475 | 20 |
| 6 | Al | Ag | 40 | 45 | 20 | 30 | 35/520 | 33/660 | 140 |

FIG. 11 is a flowchart illustrating a method for fabricating a plasmonic optical device to operate in near UV and visible wavelengths of light. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Generally however, the method follows the numeric order of the depicted steps. The method starts at Step 1100.

Step 1102 provides a substrate. Step 1104 forms nanoparticles having a core of Zn or Al, and a shell of Ag or TiN or a metal-doped semiconductor such as AZO, GZO, IGZO, or ITO. Step 1106 embeds the nanoparticles in a dielectric overlying the substrate. In one aspect, the dielectric is a tunable medium with an index of refraction responsive to an electric field. Then, Step 1108 interposes the tunable medium between a first electrode and a second electrode.

In one aspect, forming the nanoparticles in Step 1104 includes substeps. Step 1104a initially forms nanoparticles having a first diameter. In response to exposing the nanoparticles to an ambient air environment, Step 1104b maintains the nanoparticle first diameter, as the shells are more stable in the ambient air environment than the cores.

An air stable, short wavelength nanoparticle, is provided, along with optical devices made using the nanoparticles. Examples of particular materials and process steps have been presented to illustrate the invention. However, the invention is not limited to merely these examples. Other variations and embodiments of the invention will occur to those skilled in the art.

We claim:

1. A method for fabricating a plasmonic optical device to operate in near ultraviolet (UV) and visible wavelengths of light, the method comprising:
   providing a substrate;
   forming nanoparticles having a core consisting of zinc (Zn), and a shell selected from a group consisting of titanium nitride (TiN), and metal-doped semiconductors including aluminum zinc oxide (AZO), gallium zinc oxide (GZO), indium gallium zinc oxide (IGZO), and indium tin oxide (ITO); and,
   embedding the nanoparticles in a dielectric overlying the substrate.

2. The method of claim 1 wherein embedding the nanoparticles in the dielectric includes embedding the nanoparticles in a tunable medium having an index of refraction responsive to an electric field; and,
   the method further comprising:
   interposing the tunable medium between a first electrode and a second electrode.

3. The method of claim 1 wherein forming the nanoparticles includes:
   initially forming nanoparticles having a first diameter; and,
   in response to exposing the nanoparticles to an ambient air environment, maintaining the nanoparticle first diameter, as the shells are more stable in the air environment than the cores.

4. An air stable, color tunable plasmonic nanoparticle, the nanoparticle comprising:
   a core having a negative real value relative permittivity of absolute value greater than 10 in a first range of wavelengths including near ultraviolet (UV) and visible wavelengths of light; and,
   a shell overlying the core having an imaginary value relative permittivity of less than 5 in the first range of wavelengths.

5. The nanoparticle of claim 4 wherein the core is selected from a group consisting of aluminum (Al) and zinc (Zn).

6. The nanoparticle of claim 4 wherein the shell is selected from a group consisting of titanium nitride (TiN), silver (Ag), and metal-doped semiconductors including aluminum zinc oxide (AZO), gallium zinc oxide (GZO), indium gallium zinc oxide (IGZO), and iridium tin oxide (ITO).

7. The nanoparticle of claim 4 wherein the shell material remains more stable in an air environment, as compared to the core.

8. The nanoparticle of claim 4 further comprising:
   a metal layer interposed between the core and the shell.

9. The nanoparticle of claim 8 wherein the core has a first anodic index, the shell has a second anodic index, and the metal layer has a third anodic index that is between the first and second anodic indexes.

10. The nanoparticle of claim 8 wherein the nanoparticle has an Al core, Ag shell, and a chromium (Cr) metal layer.

11. A plasmonic optical device operating in near ultraviolet (UV) and visible wavelengths of light, the optical device comprising:
a substrate;
nanoparticles having a core with a negative real value relative permittivity of absolute value greater than 10 in a first range of wavelengths including near UV and visible wavelengths of light, and a shell with an imaginary relative permittivity of less than 5 in the first range of wavelengths; and,
a dielectric overlying the substrate, embedded with the nanoparticles.

12. The optical device of claim 11 further comprising:
a first electrode;
a second electrode; and,
wherein the dielectric is a tunable medium interposed between the first and second electrodes.

13. The optical device of claim 12 wherein the first electrode is transparent and formed overlying a transparent substrate;
wherein the tunable medium overlies the first electrode; and,
wherein the second electrode is transparent and overlies the tunable medium.

14. The optical device of claim 12 wherein the first electrode is optically reflective in a first range of wavelengths and formed overlying the substrate;
wherein the tunable medium overlies the first electrode; and,
wherein the second electrode is transparent and overlies the tunable medium.

15. The optical device of claim 11 wherein the shell material remains more stable in an air environment, as compared to the core.

16. The optical device of claim 11 wherein the nanoparticles have a core selected from a group consisting of zinc (Zn) and aluminum (Al), and a shell selected from a group consisting of silver (Ag), titanium nitride (TiN), and metal-doped semiconductors including aluminum zinc oxide (AZO), gallium zinc oxide GZO), indium gallium zinc oxide (IGZO), and indium tin oxide (ITO).

17. The optical device of claim 11 wherein the nanoparticles further comprise a metal layer interposed between the core and the shell.

18. The optical device of claim 17 wherein nanoparticle cores have a first anodic index, the shells have a second anodic index, and the metal layers have a third anodic index that is between the first and second anodic indexes.

19. The optical device of claim 17 wherein the nanoparticles have an Al core, Ag shell, and a chromium (Cr) metal layer.

* * * * *